UNITED STATES PATENT OFFICE.

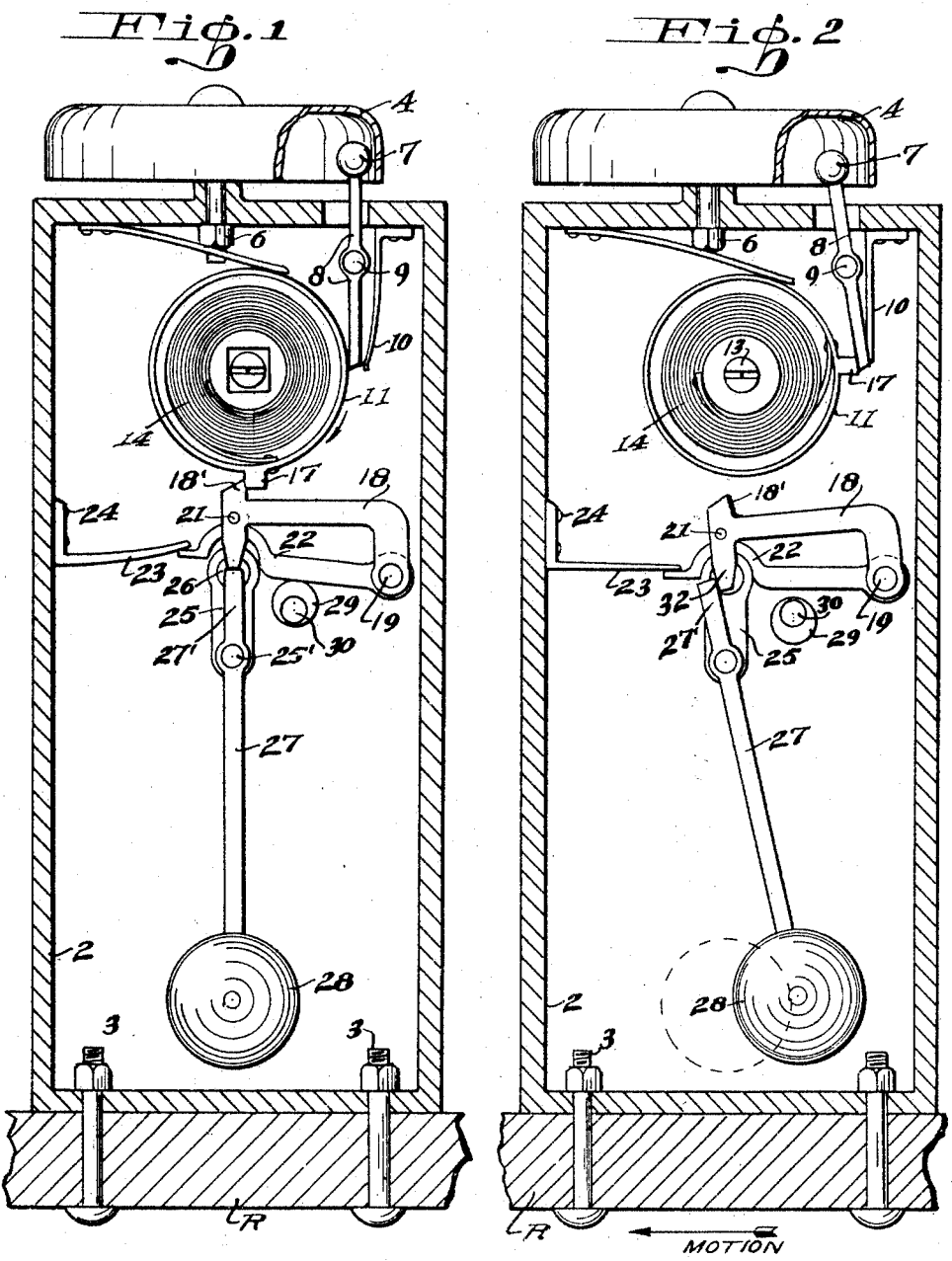

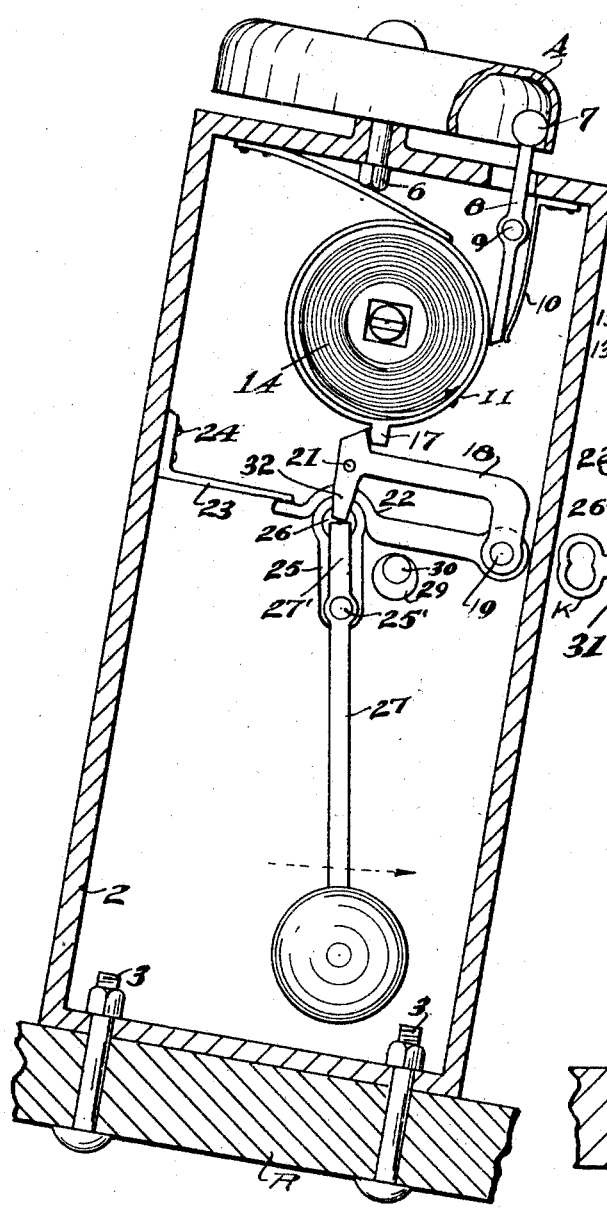
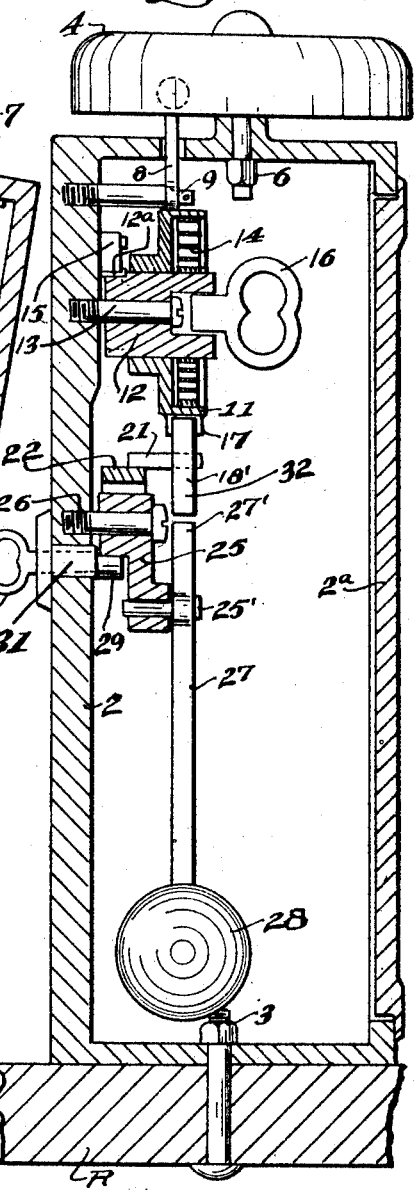

ALVEN E. WOLCOTT, OF LONG BEACH, CALIFORNIA.

THEFT-ALARM.

1,366,144.  Specification of Letters Patent.  Patented Jan. 18, 1921.

Application filed February 16, 1920. Serial No. 358,919.

*To all whom it may concern:*

Be it known that I, ALVEN E. WOLCOTT, a citizen of the United States, residing at Long Beach, in the county of Los Angeles and State of California, have invented new and useful Improvements in Theft-Alarms, of which the following is a specification.

This invention relates to theft alarms, and while it is primarily designed as an alarm for automobiles operative to give a signal when the automobile is being surreptitiously moved yet it is possible that the device is capable of effective use with various other vehicles as airplanes, launches, etc., and also may be efficiently used when applied to doors and other moving objects in cases where it would be desirable to give an alarm or signal produced by unauthorized movement of the same.

It is an object of the invention to provide a device that will efficiently operate to give a signal, for instance, as when an automobile is being quietly towed away; and a further object is to provide a device that will be a substitute for means such as locks for magnetos, gear levers, steering post locks and other various types of locks and signal giving devices.

A special object of the invention is to provide a device that will admit of an automobile or other vehicle being moved in cases of emergency or necessity as to a point of safety during the absence of the owner in the event of fire or accidents but not without giving a signal of such movement thus being an improvement over types of mechanisms that lock the machines so that they cannot be moved to places of safety or moved from restricted parking spaces.

The invention consists of the construction, the combination and in details and arrangements of the parts, an embodiment of which invention is illustrated in the accompanying drawings and described and claimed herein.

Figure 1 is a view of the signal device as arranged in a casing shown in section and applied to the running board of a vehicle, some parts being in elevation and some in section with the mechanism in unlocked or touring position.

Fig. 2 is a similar view of the parts showing the mechanism in action position to give an alarm, the controlling device being in the locked or parking position.

Fig. 3 is a view similar to Fig. 1 showing the parts in position assumed when the automobile is parked or is stationary on an inclined surface with the control device in locked or parking position.

Fig. 4 is a transverse sectional view through the casing showing the mechanism in elevation and section with the parts in touring or unlocked position.

In this adaptation of the invention it is shown as applied to the running board R of an automobile and the mechanism is preferably inclosed in a casing or box 2 into which project the threaded ends of fastening bolts 3 passing through the running board R. The casing 2 is provided with a cover or door 2ª permitting access to the interior mechanism, and mounted in suitable relation to the box is a signal giving device as a bell 4 secured as by a bell post having an inwardly extending threaded end passing through the top of the box and engaging a lock nut 6. The bell is vibrated by a clapper or hammer 7 on the end of a lever 8 extending into the casing and pivoted on a stud or pivot member 9. One end of the lever is engaged by a light spring 10 which throws the hammer 7 toward the bell. The inner end of the bell lever 8 is disposed adjacent to an actuating member comprising, in this case, a drum 11 that is secured to a hub member 12 turnably mounted on a pin or support 13 in the box or casing 2.

To the inner surface of the drum 11 there is secured one end of a spiral spring 14 the opposite end of which is secured to the hub 12, and on this there is provided ratchet teeth 12ª to engage a locking ratchet pawl 15 so that when a key 16 is inserted into the hub 12 the spring can be wound and it will place the drum 11 under torque so that it will rotate about the hub 12 when released from a controlling device.

The control of the drum 11 is secured by a gravity operated means and on the periphery of the drum there is provided a dog or lug 17 having for one function to engage the adjacent end of the bell hammer lever 8 and having for another function to engage a locking lever 18 that has a lateral shoulder 18' coöperative with the lug or dog 17. The lever 18 is pivoted on a pin 19 and has a shoulder, pin or lug 21 shown adjacent the lug 19 but extending sidewise from the lever 18, this pin 21 being designed to engage with the upper arcuate portion of a brake member 22 in the form of an arm pivoted on the pin or post 19 and extending therefrom in the same direction as the controlling device 18.

The swinging end of the brake member 22 is shown as engaged by a substantial spring 23 an end of which is secured as at 24 to an inside of the box 2.

The brake 22 is positioned so as to engage the pivot end of a crank member 25 such engagement acting frictionally under the pressure of the spring 23 to hold the crank member 25 against oscillation on its pivot or pin 26 which is shown as parallel to the pin 20 and as substantially vertically below the axis of the spring drum 11.

When the brake arm 22 is set by a means hereinafter described to clear the hub of the crank 25 the latter is free to gravitate on its pin 26. The crank 25 has a crank pin 25' on which is loosely pivoted the lever 27 of a pendulum 28 so that the latter is free to swing first on its fulcrum 25' and secondly to swing with the crank 25 if the latter is free from the brake 22.

When the device is applied to the object with relation to which it is desired to secure an audible signal when it is moved without license the pendulum crank arm 25 is designed to be under the control of the brake 22 and this is secured by suitable means comprising an eccentric 29 provided on the cylinder 30 of a cylinder lock 31 having a suitable key K; although any other suitable lock for turning the eccentric 29 may be employed. Access to the lock is had of course from the exterior of the box or casing 2.

The operator or other licensed person by inserting the key K may turn the cylinder and with it the eccentric 29 so that the latter will be set in the position shown in Fig. 1 to engage the brake arm 22 and remove this from frictional engagement with the crank 25; this is known as the touring or unlocked position of the signal controlling mechanism, and therefore the car can be moved forwardly or rearwardly with a resultant oscillation of the pendulum 28 on its pin 25' and the swinging of the crank arm 25 on its pivot 26 without restriction.

The operator or other person having the key K desiring to leave the car, or other part on which the device may be provided, inserts the key and turns the cam or eccentric 29 to an inverted position shown in Figs. 2 and 3 thus releasing the brake 22 and permitting it to frictionally engage the hub of the crank 25. While the brake arm 22 is in the position shown in Fig. 1 it engages the coöperative lug or part 21 on the restraining device 18 and the latter is lifted up so that its lug 18' engages and holds the lug 17 on the spring drum 11 against actuation under the impulse of the spring, but as the cam 29 is thrown to release the brake 22 and let it engage the crank arm 25 the restraining device 18 tends to move down or with the brake 22 and this movement is prevented by means connected to the pendulum lever 27.

This means comprises an extension 27' of the pendulum arm or lever 27, the extension being diametrically opposite to the arm and so disposed so as to occupy a position below the coöperative tappet 32 extending from the controlling member 18. If the car be standing in a horizontal plane when the brake arm 22 is released by the key actuated device 29 the brake member will engage the hub while the pendulum crank arm 25 is in a plumb position as shown in Fig. 2; but if the car be standing in an incline, as shown in Fig. 3 the pendulum crank 25 will be shown as plumb but oblique with respect to the casing or running board R due to the force of gravity on the freely swinging member at the moment before the brake 22 is applied.

When the parts are in the locked or parking position, as shown in Figs. 2 and 3, the tappet 32 by engaging the contiguous end of the stop portion 27' prevents the controlling arm 18 from releasing the lug 17 of the drum 11; this is shown in Fig. 3. But if the car be moved forwardly or rearwardly the pendulum 25 will oscillate on its fulcrum or pin 25' of the restricted crank arm with the result that the stop member 27' swings clear of the tappet part 32 of the arm 18 and the latter moves clear of the lug 17 whereupon the spring drum 11 is released and the rotation of the drum causes the lug 17 or other part on the drum to repeatedly strike the contiguous end of the bell lever 8 to produce the signal from the bell 4.

The same releasing function occurs by the swinging of the pendulum 27 whether the car is resting longitudinally on a level plane or in an inclined plane since, as shown in Fig. 4, the parts 27' and 32 are designed to mutually engage irrespective of the angular position of the crank 25 as these parts abut each other when the brake arm 22 is applied to the hub in the axis of the crank 25.

Preferably the pendulum members 25—27 are designed to have movement to and fro longitudinally of the car without lateral movement, but it is obvious that a lateral movement may be incorporated with the longitudinal movement if so desired.

Various changes may be made without departing from the spirit of the invention as claimed.

What is claimed is:

1. In an automatic theft alarm, a signal producing device; means for actuating the device; a restraining member for the actuating device; and a gravity controlled means for releasing the restraining device; said gravity controlled means including a double pivoted pendulum and the restraining means coöperative with the main pendulum member.

2. In an automatic theft alarm, a signal producing device; means for actuating the device; a restraining member for the actuating device; gravity controlled means for releasing the restraining device; said gravity controlled means including a double pivoted pendulum and the restraining means coöperative with the main pendulum member; and a key controlled brake member for setting one of the pivots of the pendulum device.

3. In an automatic alarm, a double signal producing device and means for automatically actuating the device; a gravity actuated controlling mechanism; a brake member coöperative with the gravity actuated mechanism; a restraining device for the signal actuating means, said device coöperative with the brake device; a key controlled means for applying the brake to a part of the gravity mechanism; and means operative by the motion of the gravity device to release the restraining mechanism.

In testimony whereof I have signed my name to this specification.

ALVEN E. WOLCOTT.